March 11, 1952 J. S. PINAIRE 2,588,869
UNDERWING FUELING CONNECTION
Filed Sept. 10, 1947
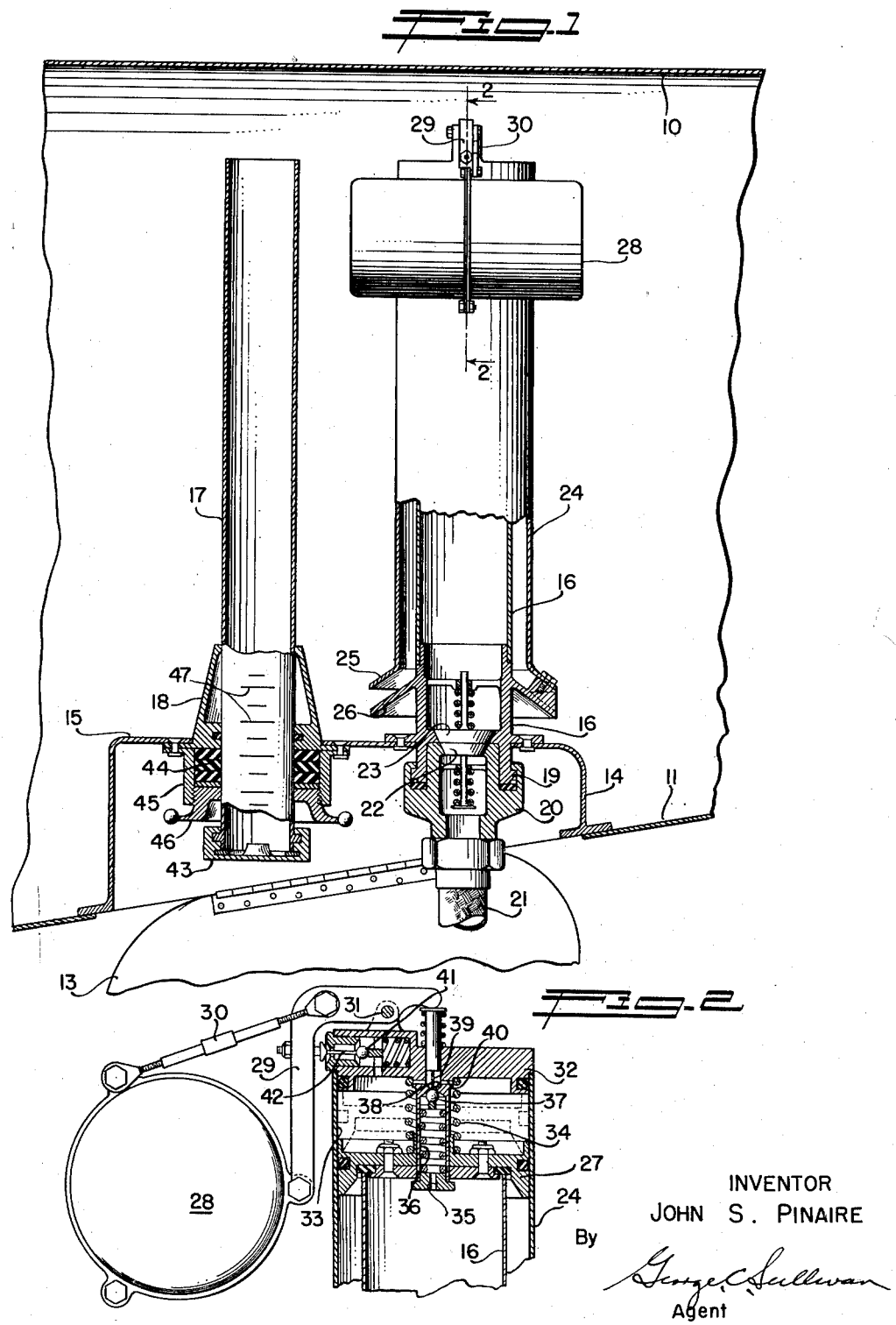
INVENTOR
JOHN S. PINAIRE
By
George C. Sullivan
Agent Patented Mar. 11, 1952

2,588,869

UNITED STATES PATENT OFFICE 2,588,869

UNDERWING FUELING CONNECTION

John S. Pinaire, Montrose, Calif., assignor to Lockheed Aircraft Corporation, Burbank, Calif.

Application September 10, 1947, Serial No. 773,279

2 Claims. (Cl. 137—68)

This invention relates to under wing fueling equipment for aircraft and the like, wherein wing and fuselage tanks may be filled from below, and has special reference to fuel tank equipment adapted to cooperate with standardized hose coupling and field installations such as underground or mobile fuel supply equipment.

With the increase in size and fuel capacity of modern aircraft, the standard practice of overwing or gravity filling of fuel tanks has become increasingly objectionable, both due to the time required to load several thousands of gallons of fuel and the necessity of service personnel climbing on top of the wing and hauling up the fueling hose thereon. In such a precarious position it has not been practical to increase the size of the hose and the rate of fuel flow in proportion to the increase in capacity of aircraft fuel tankage. Various attempts have been made to develop under wing fueling and to standardize on coupling sizes in order that the field equipment can service airplanes of different manufacture. This leaves the problem of aircraft tank fittings to cooperate with under wing fueling arrangements and it is an object of this invention to solve the problem of such fittings both to control and measure the fuel so introduced into the aircraft tanks.

Under wing fueling offers special airframe problems as to limiting impact loads of fuel being pumped into the tank, control of vaporization due to agitation in the tank, safety controls to avoid overfilling and/or pressure build-up in the tank, and means to readily determine the amount of fuel in the tank. In addition to these problems it is desirbale to substantially increase the rate of fuel delivery to reduce the refueling time when a large quantity of fuel is to be delivered. The previously mentioned standardization program for the airport service facilities contemplate an under wing fuel delivery of two hundred gallons per minute, which greatly adds to the problems of the aircraft tankage structure. It is accordingly a major object of my invention to provide aircraft tank fittings permitting the rapid introduction of fuel from beneath the wing without producing impacts, excessive pressure and fuel agitation while so doing.

It is conventional practice to supply only sufficient fuel for a contemplated flight, plus an adequate reserve. Accordingly, the fuel tanks are seldom filled to their maximum capacity, but instead the desired amount of fuel is distributed among several tanks as stress and balance conditions dictate. This customary procedure imposes further requirements on under wing fueling processes, since the amount of fuel delivered to any particular tank must be held to close limits and the exact amount in each tank should be readily ascertainable by personnel performing the fueling operation, rather than to rely on fuel guages in the aircraft cockpit. It is accordingly another important object of this invention to provide an improved and simplified under wing fueling system wherein overfilling and excessive pressures are avoided and wherein the exact amount of fuel present in the tank can readily be ascertained by the operator who attaches the hose to the tank inlet.

Other and further objects of this invention will appear as the detailed description of an embodiment of my invention proceeds, said embodiment being shown in the accompanying drawings wherein:

Figure 1 is a fragmentary section through a fuel tank integral with an airplane wing showing a preferred embodiment of my under wing fueling connection and overflow standpipe; and Figure 2 is a fragmentary detailed section on the line 2—2 of Figure 1, showing the float controlled shut off.

I have chosen to illustrate my invention as applied to an integral airplane wing fuel tank wherein the top and bottom wing skins 10 and 11 form corresponding parts of a fuel tank or compartment, the balance of the enclosure not being shown.

The lower surface 11 of the wing is shown with an access door 13 for covering an inverted pocket formed by a shell 14, the top surface 15 of the shell being perforated to receive a fueling duct 16 and a standpipe 17, the latter being slidably clamped in a bracket 18 sealed to the surface 15.

The lower end of the duct 16, which projects into the pocket formed by the shell 14, is provided with a bayonet type of interrupted peripheral flange 19 for sealing engagement by a fuel nozzle 20 on the end of a fuel hose 21. The fuel nozzle 20 is shown diagrammatically as containing a spring seated valve 22 for sealing the hose when the nozzle is disconnected from the duct 16, this valve being opened by the flow of fuel in the hose, and in turn unseating a complementary valve 23 in the bottom of the duct 16. With both valves open, fuel flows up the duct 16 and down outside being confined by a sleeve 24 terminating in a flared outlet, defined by spaced skirts 25 and 26, near the top 15 of the pocket to minimize turbulence or agitation of the entering fuel. Ordinarily this outlet will be submerged in the body of the fuel already in the tank so that entering fuel is diffused beneath the surface of the liquid, thus eliminating splashing and surface agitation of the fuel with the accompanying undesirable entrainment of air therein, which air tends to separate and add to vapor lock troubles at the reduced atmospheric pressures of high altitudes.

At the upper end of the duct 16, within the sleeve 24, a differential pressure valve 27 is arranged to seal against the top of the duct 16 to cut off further inflow of fuel when a float 28 is lifted. This mechanism, shown in Figure 2 and to be now described, is provided to prevent overfilling and also functions to prevent pressure build-up in the tank at the maximum designed capacity thereof.

The float 28 is adjustably connected to a float lever 29 by a turnbuckle 30, the lever 29 being pivoted at 31 to a cap 32 sealingly embracing the top of the sleeve 24 in spaced relationship to the top of the duct 16, to form a chamber or cylinder 33 for the valve 27 previously mentioned. The valve 27 is intended to be normally lifted against a spring 34 by fuel pressure in the duct 16, from the full line closed position to the dotted line open position, allowing fuel to overflow the top of the duct 16 in the latter position.

The valve 27 is hydraulically operated to its closed position by admitting fuel pressure through a lower orifice 35 in a central tube 36 and past a ball poppet 37 normally sealing an upper orifice 38, when the poppet has been pushed away from its seat by a plunger 39 operated by the float lever 29. Unseating the ball poppet 37 admits fuel to the chamber 33 above the valve 27 through a cross passage 40 and the unbalanced area of the valve causes it to seat against the top of the duct 16 as a result of the pressure on the fuel being delivered.

When the float mechanism has not been lifted by fuel, the ball poppet 37 is seated and the chamber 33 is vented past a second ball poppet 41 which is then unseated by a plunger 42 actuated by the float lever 29.

When the first ball poppet 37 is seated and the second ball poppet 41 is unseated, the valve 27 is free to be lifted by fuel flowing up the duct 16. When the poppet positions are reversed, the valve 27 is held to its seat against the duct 16 by fuel pressure transmitted to the upper side of the valve 27, as previously described. In the absence of fuel pressure in the duct 16 the valve 27 is normally seated in the full line position shown, but opens to the dotted line position when fuel is pumped into the duct 16.

It should be noted that the float mechanism described above is so positioned that the float 28 is lifted to close the valve 27 when the maximum permissible fuel depth is attained. Thus this mechanism is primarily a safety device to prevent overfilling. In practice an appreciable vapor and air space is reserved above the maximum designed fuel capacity, and even this maximum designed fuel capacity is seldom utilized in normal operations involving less than the maximum range of the aircraft. For less than maximum range the tanks are only partially filled, any weight saving resulting from the omission of fuel becoming available for increased passenger or cargo capacity on shorter flights.

When filling tanks at such a high rate of delivery as two hundred gallons per minute, the normal tank venting arrangements may prove inadequate, so that the standpipe 17 previously referred to serves to vent the displaced air as fuel enters the tank and provides for overflow of any excess fuel delivery as well as preventing pressure build-up in the tank. In normal operations, where the tank is not filled to the predetermined maximum, the standpipe may be used only as a vent during the filling operation or may be vertically adjusted to the predetermined desired fuel level and the operator may shut off the fuel supply when fuel starts to overflow the standpipe. As shown, the lower exposed end of the standpipe is provided with a removable cap 43 and when refueling this cap may be replaced with a drain hose similar to the filling hose 21 to avoid spilling the overflow onto the ground.

The bracket 18 adjustably supporting the standpipe is provided with a stuffing box below the pocket top 15, comprising laminated packing 44 enclosed by a sleeve 45 into which a hand wheel 46 is screwed to compress the packing against the standpipe. In practice the hand wheel may be temporarily loosened enough to permit the standpipe 17 to be adjusted up or down, and the standpipe is provided with indicia 47 calibrated to show the liquid depth or contents of the tank when the standpipe has been drawn down sufficiently to permit a slight overflow of fuel. Thereafter the standpipe is pushed up to the position shown, the hand wheel 46 tightened and the cap 43 placed in position. A similar cap may be placed on the filler connection after removal of the nozzle 20, before closing the access door 13.

The sliding standpipe 17 may be used in several ways. I prefer to raise the standpipe to the full tank level during the filling operation and to pump the approximate quantity of fuel into the tank. Thereafter the standpipe 17 is lowered until fuel starts to drip therethrough, to check the actual tank contents by the calibrated indicia 47 marked on the standpipe.

As previously mentioned, the standpipe 17 may be pre-set to the quantity of fuel desired in the tank and fuel pumped in until it overflows the standpipe. The drawback to this method is the slowness of human reactions, as ten or fifteen gallons of fuel might be spilled before the operator shuts off the pump, when operating at such high delivery rates as two hundred gallons per minute. In order to eliminate the danger and waste of such overflow, a return line can be provided but the fuel returned would have to be measured and deducted from the pump delivery meter, in order to determine the net fuel delivered to the tank.

While I have described a particular embodiment of my invention in connection with under wing refueling of fuel tanks, it is to be understood it can be used for introducing other liquids into overhead tanks where access to the top thereof with portable equipment is laborious and/or hazardous. Many changes may be made in the details of the disclosed construction to suit such varied requirements and I do not desire to limit myself other than by the scope of the invention as set forth in the appended claims.

I claim as my invention:

1. An under wing tank filling connection comprising an inlet duct located in the bottom of the tank and extending upwards therein above the maximum liquid level in said tank, a quick-detachable self-sealing nozzle connection to the lower end of said duct, said lower end of the duct having a check valve therein opened by the pressure of fluid in said hose nozzle when the latter is connected thereto whereby to prevent emptying of said duct when the hose nozzle is detached therefrom, a concentric sleeve surrounding said inlet duct, a diffuser associated with the lower end of said sleeve and so located within the tank as to be normally positioned below the liquid therein, a differential pressure valve slidable in said sleeve above said inlet duct, said valve being arranged to seat on top of said inlet duct in one position thereof, a cap seated on said sleeve to define a chamber above said differential valve, a first valve carried by said cap arranged to admit fluid past said differential pressure valve into the chamber thereabove, a second valve arranged to vent said chamber, and float controlled means for alternately opening one of said first and second valves and simultaneously closing the other in response to variations in liquid level on said tank.

2. An arrangement as in claim 1 wherein the differential pressure valve seats against the top of the inlet duct when the float opens said first valve and closes the second valve to the chamber in the sleeve above said differential pressure valve.

JOHN S. PINAIRE.

REFERENCES CITED

The following references are of record in the file of this patent:

UNITED STATES PATENTS

| Number | Name | Date |
| --- | --- | --- |
| 387,064 | Gibbs | July 31, 1888 |
| 703,805 | Murray | July 1, 1902 |
| 1,019,724 | Polizzi | Mar. 5, 1912 |
| 1,302,538 | Gulick | May 6, 1919 |
| 1,377,994 | Wagner | May 10, 1921 |
| 1,540,684 | Eades | June 2, 1925 |
| 1,703,295 | Cary | Feb. 26, 1929 |
| 1,810,366 | Martin | June 16, 1931 |
| 2,092,670 | Hess | Sept. 7, 1937 |
| 2,318,236 | Layton | May 4, 1943 |
| 2,384,628 | Krone | Sept. 11, 1945 |
| 2,477,186 | Koeler | July 26, 1949 |

FOREIGN PATENTS

| Number | Country | Date |
| --- | --- | --- |
| 347,338 | France | of 1905 |